ём

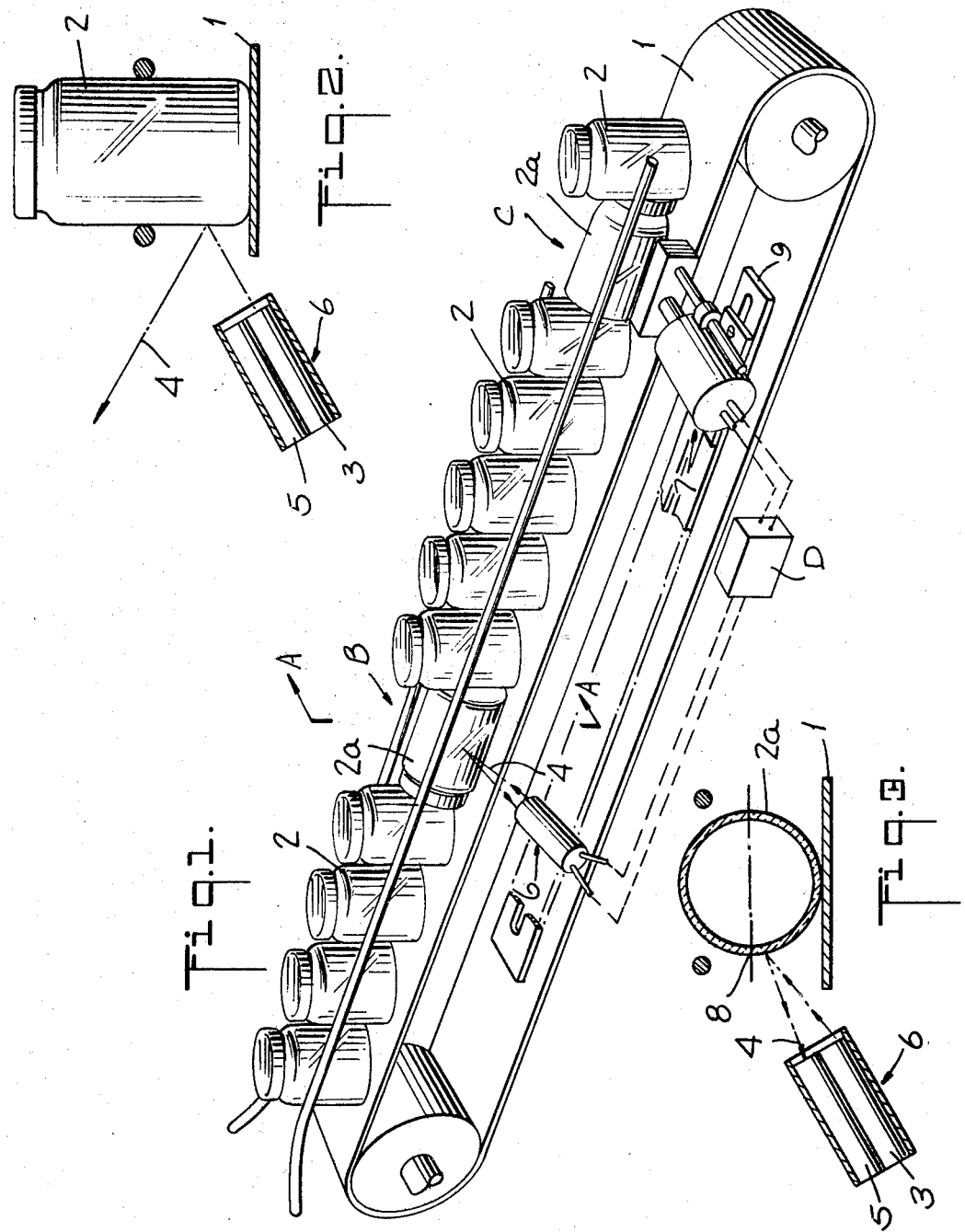

United States Patent Office 3,506,840
Patented Apr. 14, 1970

3,506,840
DOWN-WARE REJECTOR SYSTEM
Roger H. Fink, Fairfield, Ohio, assignor to Anchor Hocking Glass Corporation, Lancaster, Ohio, a corporation of Delaware
Filed Sept. 8, 1967, Ser. No. 666,318
Int. Cl. B07c 5/342
U.S. Cl. 250—223          10 Claims

ABSTRACT OF THE DISCLOSURE

A non-mechanical system for detecting fallen articles in a line of upright articles, such as glass jars or other cylindrical containers, on a conveyor wherein a source of radiation is mounted on the side of the conveyor with the beam directed against the moving articles. The angle of incidence of the beam is so adjusted that upright articles will reflect the sensing beam upwardly and outwardly away from a suitable detector adjacent the beam source while fallen articles will reflect the beam directly back onto the detector which will initiate the operation of the rejection means.

BACKGROUND OF THE INVENTION

The present invention relates to a system for detecting fallen objects in a line of normally upright objects on a conveyor and particularly to a system for detecting fallen containers on a moving conveyor conducting a single line of upright containers.

In container manufacturing plants and other container handling locations, such as canneries, where the containers are moved in a single line from one location to another on a conveyor belt in high speed operation, a container occasionally falls onto the conveyor from its normal upright position. Such fallen containers or "down-ware" may result in jamming of the line at corners or other points in the conveyor run and also may interfere with the proper inspection and handling of the containers at other positions in the conveyor system. It is, therefore, important that these fallen containers be quickly detected and removed from the conveyor line in advance of reaching these critical areas.

This operation is presently accomplished by mechanical sensing devices which operate on the principle of detecting the different shapes between upright and fallen containers and which cause the fallen containers to drop through exit chutes having pedetermined proportions which will pass only the fallen containers. These present selectors are not fully reliable and, in addition, as they depend on variations in container shape and size they have to be adjusted or changed when the particular containers to be handled vary even slightly in size or shape.

SUMMARY OF INVENTION

The system of the present invention overcomes these prior mechanical limitations and utilizes a source of radiant energy such as a lamp or sonic beam generator to distinguish between fallen and upright containers and ware of various dimensions and sizes. The present system is operative even with relatively large changes in container size and shape and additionally may be readily adjusted by a simple repositioning of the sensing device when accommodating for very significant changes in the container size and shape. It is particularly suited for high speed operation and reliable rejection and may be used with commercially available line sensing means and installations.

It is, therefore, an object of the present invention to provide an improved system for detecting fallen articles on a conveyor conducting a single line of upright articles.

It is another object of the present invention to provide a non-mechanical detector which is adapted to be used with articles of widely varying sizes and shapes.

It is another object of the present invention to use the reflection of a beam of radiation as an indicator in detecting fallen containers on a conveyor line.

It is a further object of the present invention to provide detecting means which are simple and compact in construction and inexpensive in operation and are readily adapted for use with existing installations.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of the system of the present invention in operation.

FIG. 2 is a view taken in the plane A—A of the conveyor as shown in FIG. 1 as an upright container passes the point of inspection.

FIG. 3 is a view taken in the plane A—A of the conveyor as shown in FIG. 1 as a fallen container passes the point of inspection.

DETAILED DESCRIPTION OF THE INVENTION

The present invention is adapted for use with any type of cylindrical or rounded edge article and particularly for use in connection with containers such as cans and glass jars. FIG. 1 shows a single line conveyor 1 transporting a line of glass jars 2 during the glass manufacturing operation or when the jars are ready to be filled with a product. During such processing the jars are generally transported in the upright position and the various machinery used in the process is designed to handle them in this orientation. Occasionally during transporting and handling a jar will be tipped over or will fall on its side as indicated at B and C. This reorientation may cause the fallen jar 2a "down-ware" to become jammed in the conveyor 1 or in a processing machine during the path of travel. This jamming may require the shutting down of the entire line to remove the fallen jar 2a and may also cause other adverse conditions in the system resulting in the loss or contamination of a number of the other jars in the line.

In accordance with the present invention to detect such fallen jars 2a a source of radiation 3 is mounted adjacent to the conveyor 1 with its beam directed to strike and be reflected from the adjacent sides of the passing ware 2. In the preferred embodiment to the radiation source 3 is a lamp producing a beam of light but it is within the purview of the present invention to use any related and analogous radiation source such as a sonic generator, a radioactive particle source, or the like. The radiation source 3 has an associated detecting means 5 which senses the reflected beam of radiation and provides a signal which indicates the direct reflection of the beam 4. In the preferred embodiment the detecting means 5 is a photocell which may be incorporated in the same housing 6 as the light source 3. In the event a sonic generator is used the detecting device would be an audio receiver, and a geiger counter or the like would be used with a particle source.

The indicator signal may be used to trigger a reject means as shown at 7. This means 7 may be any one of a number of commercially available devices of this type and will operate to remove a container 2a from the conveyor 1 as the indicator signal occurs in the phootcell or other detector means 5. The rejection means 7 shown is a solenoid-operated plunger but an air-blast device has been used with equal effectiveness. The rejection means 7 may be located at the same point B along the conveyor 1 as the detecting means 5 or may be positioned further down along the conveyor line as shown at C. In the latter case a memory device shown at D may be used to delay the triggering of the reject means 7 until the detected ware 2a has reached the rejection position C.

The reject means 7 is shown mounted in a bracket 9 which permits adjustable positioning of the device 7 along the conveyor 1. When the reject means 7 is to be located near the point B, the detector unit 6 may be mounted above the passing ware 2 to permit more freedom of adjustment of both the detector 6 and the reject means 7. The position of the reject means 7 along the conveyor 1 may then be adjusted to compensate for any time lag inherent in the detect-reject system.

The discriminating operation of the system may be seen with reference to FIGS. 2 and 3. In FIG. 2 the radiant beam 4 is shown striking and being reflected from an upright container 2 and in FIG. 3 it is striking and being reflected from a container 2a lying on its side. As is clear from FIG. 2 when the container is upright the incident beam 4 strikes the linearly oriented side and will be reflected upwardly and away from the source and detector unit 6 located adjacent the conveyor belt 1. Under normal conditions then no signal will be produced in the detector 5. However, as shown in FIG. 3 when the container 2a is lying on its side in the "down" position the beam 4 will strike the lower portion of its rounded surface and will be reflected directly back towards the detector unit where it falls upon the photocell or other sensor 5 producing an indicative signal, Thus, when initially setting up the detecting system 6 the direction of the radiant beam 4 with respect to the containers 2 will be set at such an angle as to strike the surface of any fallen container 2a at a point beneath the outermost point in its curvature 8. Where containers of various sizes and shapes are to be passed on the conveyor 1 it is simply necessary to be sure that the radiant beam 4 is directed to fall on the underside of the container having the lowest point of curvature 8 in the "down" position. The beam 4 in this setting will, then, be reflected back towards the source 3 by all the containers of larger curvature. The beam is reflected upward and away when it strikes the linearly oriented surface of an upright container 2 or falls on a point on the upper curvature above point 8 on the side of a fallen container 2a.

Conversely the system works equally well with the radiation and detecting apparatus 6 positioned above the conveyor 1 with the beam 4 being directly downwardly against the sides of the containers 2. It will be seen that if the beam 4 strikes any point on the side of a fallen container 20 above the outermost point 8 of its curvature that the system will similarly operate effectively to remove the "down" ware 2a.

A signal will thus be produced each time a fallen jar 2a passes the point of the detector unit 6 on the conveyor 1 and the signal will activate the ejecting means 7 for removal of the fallen jar 2a from the line of containers 2. Upright jars and containers will cause no reaction in the system and will pass freely along the conveyor to further points of inspection and processing.

It will thus be seen that an improved system has been provided for detecting and rejecting fallen objects such as jars or containers on a high speed conveyor line transporting a number of upright containers. It is apparent that this system may be used in connection with jars of varying sizes. In the event that the variation in size is a large one the detector unit requires only a simple adjustment in its projection angle to prepare it for proper detecting operation. This system is readily adaptable for handling jars of widely varying sizes, is easily adjustable and is compact in construction and inexpensive in operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A method of detecting and rejecting fallen containers in a line of upright containers passing on a conveyor comprising the steps of directing a beam of radiation against the sides of said containers, setting the angle of incidence of said radiation such that when the beam strikes an upright container it will be reflected in one direction and when it strikes a fallen container it will be reflected in another direction, sensing said beam when reflected in said another direction, and removing said fallen container from the liner in response to the sensing of said beam.

2. The method as claimed in claim 1 wherein said radiation is a light beam.

3. The method as claimed in claim 1 wherein said radiation is a sonic beam.

4. The method as claimed in claim 1 wherein said radiation is a beam of radioactive particles.

5. The method as claimed in claim 1 wherein the removal of said fallen containers from the line is delayed for a short time after the sensing of the radiant beam.

6. A system for continuously conveying and delivering a line of articles in predetermined upright positions from a feed point to a delivery point comprising the combination of a conveyer, means for driving the conveyor, means for aligning the moving articles on the conveyer in a single file, a source of radiation for projecting a beam of radiation, means for positioning the beam direction causing it to strike the moving articles and to be reflected in one direction when it strikes upright articles and to be reflected in another direction when it strikes fallen articles, beam sensing means responsive to beam reflections from fallen articles, control means coupled to said sensing means for generating an article reject signal, and an article reject means coupled to said control means for rejecting the fallen articles from the conveyer.

7. A system as claimed in claim 6 wherein said radiation source is a light source and said sensing means is a light sensitive element.

8. A system as claimed in claim 6 wherein said radiation source is a sonic generator, and said sensing means is a sonic receiver.

9. A system as claimed in claim 6 wherein said radiation source is a source of radio-active particles, and said sensing means is sensitive to radio-active particles.

10. A system as claimed in claim 6 wherein a delay mean is positioned between said sensing means and said rejecting means.

References Cited

UNITED STATES PATENTS

| 3,404,282 | 10/1968 | Walker | 250—223 |
| 2,902,151 | 9/1959 | Miles | 209—111.7 |
| 2,999,589 | 9/1961 | Norwich | 209—111.9 |
| 3,073,444 | 1/1963 | Bielinski | 209—111.9 |

FOREIGN PATENTS 1,132,416  6/1962  Germany.

RICHARD E. AEGERTER, Primary Examiner

U.S. Cl. X.R.

209—111.7